US009288745B2

United States Patent
Zheng (10) Patent No.: US 9,288,745 B2
(45) Date of Patent: Mar. 15, 2016

(54) CELL SEARCH METHOD OF TERMINAL AND RELATED DEVICE AND SYSTEM

(75) Inventor: Xiaochun Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 279 days.

(21) Appl. No.: 13/339,067

(22) Filed: Dec. 28, 2011

(65) Prior Publication Data
US 2012/0147850 A1 Jun. 14, 2012

Related U.S. Application Data

(63) Continuation of application No. PCT/CN2011/079185, filed on Aug. 31, 2011.

(30) Foreign Application Priority Data

Dec. 9, 2010 (CN) .......................... 2010 1 0581106

(51) Int. Cl.
*H04W 4/00* (2009.01)
*H04W 48/16* (2009.01)
*H04W 36/24* (2009.01)
(Continued)

(52) U.S. Cl.
CPC .............. *H04W 48/16* (2013.01); *H04W 36/24* (2013.01); *H04W 36/0011* (2013.01); *H04W 48/08* (2013.01); *H04W 88/06* (2013.01)

(58) Field of Classification Search
CPC . H04W 80/04; H04W 36/18; H04W 36/0011; H04W 36/14; H04W 36/08; H04W 36/30; H04W 36/24; H04W 48/08; H04W 88/06
See application file for complete search history.

(56) References Cited

U.S. PATENT DOCUMENTS 7,133,384 B2 * 11/2006 Park et al. ................ 370/331
8,855,725 B2 * 10/2014 Kim ...................... H04B 1/3816
455/436

(Continued)

FOREIGN PATENT DOCUMENTS

| CN | 1358038 A | 7/2002 |
|---|---|---|
| CN | 1541017 A | 10/2004 |

(Continued)

OTHER PUBLICATIONS

International Search Report issued in corresponding PCT Patent Application No. PCT/CN2011/079185, mailed Dec. 8, 2011.

(Continued)

*Primary Examiner* — Lonnie Sweet
(74) *Attorney, Agent, or Firm* — Brinks Gilson & Lione (57) ABSTRACT

A cell search method of a terminal is provided. The terminal includes first and second network units. The first network unit camps a CS domain on a first network preferentially, and executes a CS domain service; the second network unit camps a PS domain on a second network preferentially, and executes a PS domain service; the first network unit receives a system message from a cell of the first network where the first network unit is located, and determines whether the system message carries neighboring cell information of the second network of the cell; and the second network unit searches for a cell of the second network after the first network unit determines that the system message carries the neighboring cell information of the second network of the cell. With the solutions, subscriber experience can be improved and cell search time of the terminal can be reduced.

18 Claims, 5 Drawing Sheets

(51) Int. Cl.
*H04W 36/00* (2009.01)
*H04W 48/08* (2009.01)
*H04W 88/06* (2009.01)

(56) References Cited

U.S. PATENT DOCUMENTS

| | | | |
|---|---|---|---|
| 2002/0071404 A1 | 6/2002 | Park et al. | |
| 2004/0043791 A1* | 3/2004 | Reddy | H04L 29/12009 455/558 |
| 2009/0215472 A1* | 8/2009 | Hsu | G06K 19/0701 455/458 |
| 2009/0280810 A1* | 11/2009 | Mahdi et al. | 455/436 |
| 2011/0149907 A1* | 6/2011 | Olsson et al. | 370/331 |
| 2011/0243099 A1* | 10/2011 | Chin et al. | 370/335 |
| 2012/0147850 A1* | 6/2012 | Zheng | 370/331 |
| 2012/0252443 A1* | 10/2012 | Zheng et al. | 455/426.1 |
| 2013/0235847 A1* | 9/2013 | Li et al. | 370/331 |
| 2013/0310031 A1* | 11/2013 | Zheng et al. | 455/434 |

FOREIGN PATENT DOCUMENTS

| | | |
|---|---|---|
| CN | 1753553 A | 3/2006 |
| CN | 1910834 A | 2/2007 |
| CN | 101754472 A | 6/2010 |
| CN | 102143555 A | 8/2011 |
| EP | 1213941 A2 | 6/2002 |
| GB | 2322051 A | 8/1998 |

OTHER PUBLICATIONS

Office Action issued in corresponding Chinese Patent Application No. 201010581106.7, mailed Feb. 16, 2013.

\* cited by examiner

CELL SEARCH METHOD OF TERMINAL AND RELATED DEVICE AND SYSTEM

CROSS-REFERENCE TO RELATED APPLICATIONS

This application is a continuation of International Application No. PCT/CN2011/079185, filed on Aug. 31, 2011, which claims priority to Chinese Patent Application No. 201010581106.7, filed on Dec. 9, 2010, both of which are incorporated herein by reference in their entireties.

FIELD

The present disclosure relates to the field of communications technologies, and in particular, to a cell search method of a terminal and related device and system.

BACKGROUND

Currently, networks of the second generation global mobile communication technology/third generation global mobile communication technology (2G/3G, 2nd Generation/3rd Generation) have been deployed in many areas.

Based on communication development needs, the third Generation Partnership Project standardization organization introduces a new-generation evolution network, for example, a long term evolution (LTE, Long Term Evolution) network. The new-generation evolution network has covered some urban areas and traffic hot spot areas.

For different network bearer mechanisms, mobile communication services may be divided into:

services borne by a circuit switching (CS, Circuit Switching) domain, for example, voice phone, short message, and supplementary services; and services borne by a packet switching (PS, Packet Switching) domain, including data services, and session services.

Because a 2G network have undergone long term construction, the network coverage of the 2G network is much better than that of a 3G network, and this situation will not change in a short term. Therefore, in order to enable a subscriber to use wireless services in more places, existing 2G/3G terminals usually all support the 2G network. Currently, most of 3G terminals are 2G/3G dual-mode mobile phones (specifically, single-card dual-mode terminals). With the continuous development of the (4th Generation) 4G technology, a terminal that can support LTE will also be gradually popularized in future, and 2G/3G/LTE networks will probably coexist in a long term.

Currently, the 3G network with an advanced standard is suitable for data services, while the 2G network with perfect signal coverage (for example, a global system for mobile communications (GSM, Global System for Mobile Communications)) is suitable for CS domain services (mainly including voice services). When an existing single-card dual-mode terminal performs reselection from one network to another network (for example, performs reselection from a 3G network to a 2G network), a period of time when services are unavailable exists, that is, in this period of time, services are interrupted, and neither CS domain services nor PS domain services can be performed. Moreover, the existing single-card dual-mode terminal has no rapid and effective search solution in network reselection.

SUMMARY

Embodiments of the present disclosure provide a cell search method of a terminal and related device and system, to ensure the continuity of CS domain services and PS domain services as much as possible, reduce the time of service unavailability, improve subscriber experience, and reduce cell search time of the terminal.

In order to solve the foregoing problems, the embodiments of the present disclosure provide the following solutions:

A cell search method of a terminal, where the terminal includes a first network unit and a second network unit, includes: camping, by the first network unit, a circuit switching CS domain on a first network preferentially, and executing a CS domain service; camping, by the second network unit, a packet switching PS domain on a second network preferentially, and executing a PS domain service; receiving, by the first network unit, a system message from a cell of the first network where the first network unit is located, and determining whether the system message carries neighboring cell information of the second network of the cell; and searching, by the second network unit, for a cell of the second network after the first network unit determines that the system message carries the neighboring cell information of the second network of the cell, where signal coverage of the first network is better than that of the second network, and a data transmission rate of the second network is higher than that of the first network.

A terminal includes: a first network unit, configured to camp a circuit switching CS domain on a first network preferentially, and execute a CS domain service; and a second network unit, configured to camp a packet switching PS domain on a second network preferentially, and execute a PS domain service, where signal coverage of the first network is better than that of the second network, and a data transmission rate of the second network is higher than that of the first network; the first network unit is further configured to receive a system message from a cell of the first network where the first network unit is located, and determine whether the received system message carries neighboring cell information of the second network of the cell; and the second network unit is further configured to search for a cell of the second network after the first network unit determines that the received system message carries the neighboring cell information of the second network of the cell.

A communication system includes: a wireless access device, configured to deliver a system message in a cell of a first network served by the wireless access device; and a terminal, including a first network unit and a second network unit, where the first network unit is configured to camp a circuit switching CS domain on the first network preferentially, and execute a CS domain service; the second network unit is configured to camp a packet switching PS domain on a second network preferentially, and execute a PS domain service; the first network unit is further configured to receive a system message from a cell of the first network where the first network unit is located, and determine whether the received system message carries neighboring cell information of the second network of the cell; and the second network unit is further configured to search for a cell of the second network after the first network unit determines that the received system message carries the neighboring cell information of the second network of the cell, where signal coverage of the first network is better than that of the second network, and a data transmission rate of the second network is higher than that of the first network.

It can be seen from the foregoing that, the terminal provided in the embodiments of the present disclosure includes a first network unit and a second network unit, the terminal supports camp on two networks at the same time, the first network unit camps a circuit switching CS domain on a first network with better signal coverage preferentially, and executes a CS domain service; the second network unit camps a packet switching PS domain on a second network with a higher data transmission rate preferentially, and executes a PS domain service. Because the CS domain service (for example, voice service) is sensitive to service unavailability, and the first network has better signal coverage, camping the CS domain on the first network may make the CS domain service more stable and improve subscriber experience, while camping the PS domain on the second network preferentially may make the experience of high-speed data transmission enjoyed. Moreover, after the terminal receives a system message of a cell of a certain network where the terminal is located, the terminal first determines whether the system message carries neighboring cell information of another network of the cell, and if the system message carries neighboring cell information of another network of the cell, then searches for a cell of said another network. In this way, the terminal may perform a cell search of another network with a more specific purpose, so as to avoid an ineffective cell search as much as possible, reduce cell search time of the terminal, and improve search efficiency, thus relatively reducing a processing load of the terminal and extending standby time of the terminal.

BRIEF DESCRIPTION OF THE DRAWINGS

To illustrate the solutions in the embodiments of the present disclosure and in the prior art more clearly, accompanying drawings for describing the embodiments and the prior art are given briefly below. Apparently, the accompanying drawings in the following description are only some embodiments of the present disclosure, and persons of ordinary skill in the art may further obtain other drawings from these accompanying drawings without creative efforts.

FIG. 2-*a* is a schematic flow chart of another cell search method of a terminal according to an embodiment of the present disclosure;

FIG. 2-*b* is a schematic structural diagram of a terminal according to an embodiment of the present disclosure;

FIG. 2-*c* is a schematic structural diagram of another terminal according to an embodiment of the present disclosure;

DETAILED DESCRIPTION OF THE EMBODIMENTS

Embodiments of the present disclosure provide a cell search method of a terminal and related device and system.

To make persons skilled in the art understand the solutions of the present disclosure better, the solutions in the embodiments of the present disclosure are clearly and completely described in the following with reference to the accompanying drawings in the embodiments of the present disclosure. Obviously, the embodiments to be described are only part of rather than all of the embodiments of the present disclosure. All other embodiments obtained by persons of ordinary skill in the art based on the embodiments of the present disclosure without creative efforts shall fall within the protection scope of the present disclosure.

Figure 6:
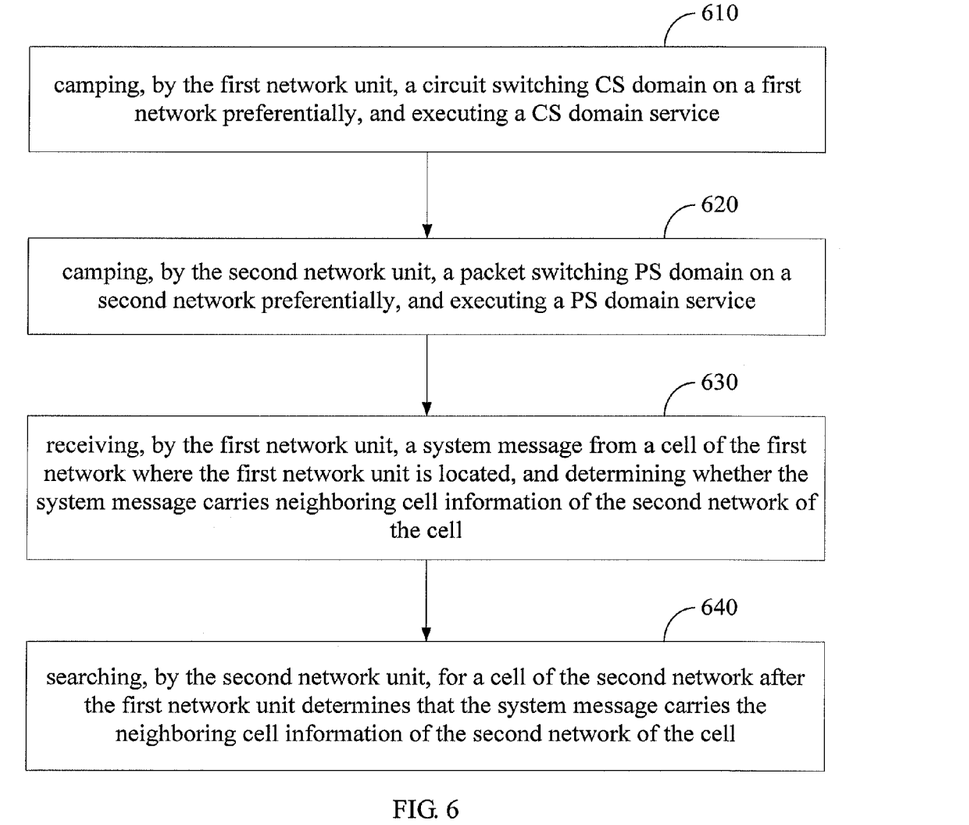
FIG. 6 is a schematic flow chart of cell search method of a terminal according to an embodiment of the present disclosure.

In an embodiment of a cell search method of a terminal in the present disclosure, the terminal includes a first network unit and a second network unit, and referring to FIG. 6, the method may include: camping, 610, by the first network unit, a circuit switching CS domain on a first network preferentially, and executing a CS domain service; camping, 620, by the second network unit, a packet switching PS domain on a second network preferentially, and executing a PS domain service; receiving, 630, by the first network unit, a system message from a cell of the first network where the first network unit is located, and determining whether the system message carries neighboring cell information of the second network of the cell; and searching, 640, by the second network unit, for a cell of the second network after the first network unit determines that the system message carries the neighboring cell information of the second network of the cell.

Here, the CS domain or PS may be understood as a collection of software and hardware that are related to the processing of CS domain services or PS domain services. The camping the CS domain on the first network may specifically be implemented through a CS Attach procedure, and the camping the PS domain on the second network may specifically be implemented through a PS Attach procedure. Reference may be made to the Attach procedure defined in the standard for these procedures, which are not repeatedly described here.

Figure 1:
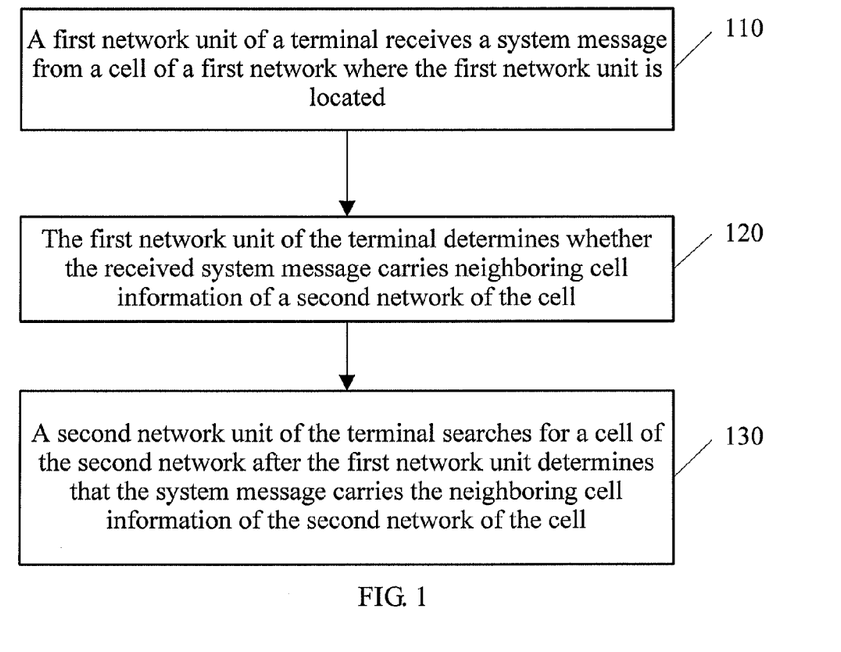
FIG. 1 is a schematic flow chart of a cell search method of a terminal according to an embodiment of the present disclosure.

Referring to FIG. 1, the specific steps may include:

110: A first network unit of a terminal receives a system message from a cell of a first network where the first network unit is located.

In an application scenario, the first network unit of the terminal camps a circuit switching CS domain on the first network preferentially, and executes a CS domain service; and a second network unit of the terminal camps a packet switching PS domain on a second network preferentially, and executes a PS domain service.

The terminal mentioned in the embodiment of the present disclosure may refer to a single-card dual-standby terminal, that is, may base on one subscriber identity module card and support camp on two networks, referred to as a first network and a second network, at the same time. Signal coverage of the first network is better than that of the second network, and a data transmission rate of the second network is higher than that of the first network. The first network and the second network may be two networks of different generations. For example, the first network is a 2G network, and the second network is a 3G network; or, the first network is a 2G network, and the second network is a 4G network (for example, an LTE network); or, the first network is a 3G network, and the second network is a 4G network.

Certainly, the first network and the second network may also be two different networks of the same generation, for example, the second network may be a wideband code division multiple access network, or a time division-synchronous code division multiple access network.

In an application scenario, after the terminal powers on and starts up, the terminal may perform a network search, and the first network unit of the terminal may receive a system message from a cell where the first network unit is located (which may be referred to as a first cell for ease of description) (the system message may be a system broadcast message of the first cell). The system message may carry some related information of the first cell, for example, may carry a cell identity of the first cell, and other neighboring cell information of the network to which the first cell belongs (which may be referred to as a first network for ease of description) (the neighboring cell information may be recorded in a neighboring cell list of the first network, that is, the system message may carry the neighboring cell list of the first network, where the neighboring cell list of the first network records the neighboring cell information of the first network). In addition, if neighboring cell information corresponding to another network (which may be referred to as a second network for ease of description) is further configured by the first cell (the neighboring cell information may be recorded in a neighboring cell list of the second network, that is, the system message may carry the neighboring cell list of the second network, where the neighboring cell list of the second network records the neighboring cell information of the second network), the system message may further carry the neighboring cell information which is configured by the first cell and corresponds to said another network.

120: The first network unit of the terminal parses the received system message to determine whether the system message carries neighboring cell information of a second network of the cell.

If it is determined through parsing that the received system message carries the neighboring cell information of the second network of the first cell, it may be considered that a cell of the second network is deployed near the area where the dual-standby terminal is located; if the received system message does not carry the neighboring cell information of the second network of the first cell, it may be considered that a cell of the second network may not be deployed near the area where the dual-standby terminal is located (or, it is possible that a cell of the second network is deployed near the area where the dual-standby terminal is located, but no corresponding neighboring cell configuration is performed on the first cell).

130: The second network unit of the terminal searches for a cell of the second network after the first network unit determines that the system message carries the neighboring cell information of the second network of the cell.

In an application scenario, if the system message carries the neighboring cell information of the second network of the first cell, and the terminal does not camp on any cell of the second network yet (for example, the terminal may have powered on and started up just now, or the terminal does not camp on any cell of the second network currently), the second network unit of the terminal may search for the cell of the second network according to the neighboring cell information of the second network, where the neighboring cell information of the second network is carried in the system message.

Or, if the first network is reselected for a service of the terminal, where the service of the terminal camps on the second network (for example, the current cell of the second network is probably not suitable for the service), at this time, if the first network unit of the terminal determines that the system message carries the neighboring cell information of the second network of the first cell, the first network unit of the terminal may search for a cell of the second network according to the neighboring cell information of the second network, or directly search for a cell of the second network at all frequencies.

In addition, if the first network unit of the terminal determines that the system message does not carry the neighboring cell information of the second network of the first cell, the second network unit of the terminal may temporarily not search for a cell of the second network, or may search for a cell of the second network in all frequency bands.

It can be seen from the foregoing that, the terminal in this embodiment includes a first network unit and a second network unit, the terminal supports camp on two networks at the same time, the first network unit camps a circuit switching CS domain on a first network with better signal coverage preferentially, and executes a CS domain service; the second network unit of the terminal camps a packet switching PS domain on the second network with a higher data transmission rate preferentially, and executes a PS domain service. Because the CS domain service (for example, voice service) is sensitive to service unavailability, and the first network has better signal coverage, camping the CS domain on the first network may make the CS domain service more stable and improve subscriber experience, while camping the PS domain on the second network preferentially may make the experience of high-speed data transmission enjoyed. Moreover, after the terminal receives a system message of a cell of a certain network where the terminal is located, the terminal first determines whether the system message carries neighboring cell information of another network of the cell, and if the system message carries neighboring cell information of another network of the cell, then searches for a cell of said another network. In this way, the terminal may perform a cell search of another network with a more specific purpose, so as to avoid an ineffective cell search as much as possible, reduce cell search time of the terminal, and improve search efficiency, thus relatively reducing a processing load of the terminal and extending standby time of the terminal.

To facilitate better understanding of the solution in the embodiment of the present disclosure, a specific scenario of a cell search of a terminal (for example, a single-card dual-standby terminal) that may operate in a GSM network and a TD-SCDMA (Time Division-Synchronous Code Division Multiple Access, time division-synchronous code division multiple access) network at the same time after power-on and start-up is taken as an example in the following for introducing the solution in the embodiment of the present disclosure in more detail.

For example, the terminal is currently located in a cell c1 of a GSM network.

Figure 2A:
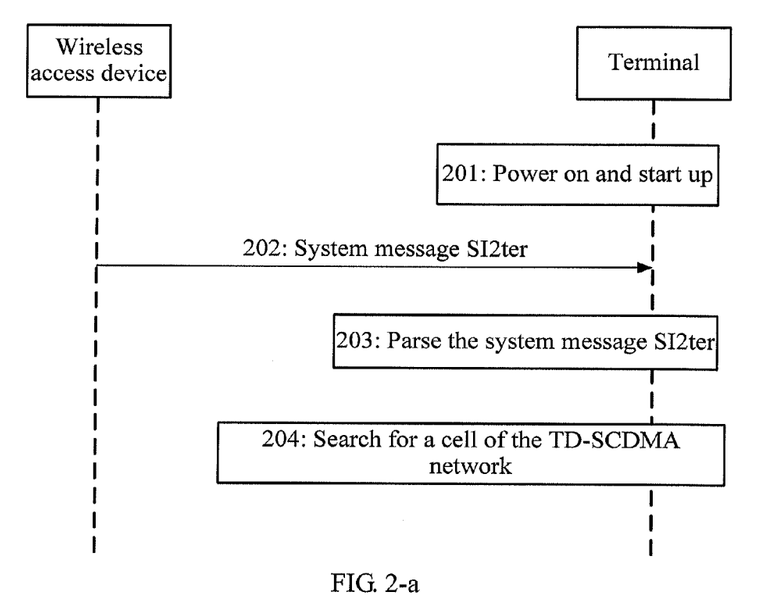

Referring to FIG. 2-a, another embodiment of a cell search method of a terminal in the present disclosure may include:

S201: A terminal powers on and starts up.

The terminal includes a first network unit and a second network unit, the first network unit camps a circuit switching CS domain on a GSM network preferentially, and executes a CS domain service; and the second network unit of the terminal camps a packet switching PS domain on a TD-SCDMA network preferentially, and executes a PS domain service.

S202: A serving wireless access device of a cell c1 delivers a system message SI2ter in the cell c1.

In an application scenario, the serving wireless access device of the cell c1 may deliver the system message SI2ter in the cell c1 periodically or upon triggering of a specific event (the specific event, for example, may be a change of configuration information of the cell c1), where the system message SI2ter carries some related information of the cell c1, for example, may carry a cell identity of the cell c1, and a neighboring cell list of the GSM network to which the cell c1 belongs (the neighboring cell list records neighboring cell information of the GSM network). In addition, if a neighboring cell list corresponding to another network (for example, a TD-SCDMA network) is further configured by the cell c1 (the neighboring cell list records neighboring cell information of the TD-SCDMA network), the system message SI2ter may further carry the neighboring cell information of the TD-SCDMA network, where the neighboring cell information of the TD-SCDMA network is configured by the cell c1.

S203: The terminal receives the system message SI2ter from the cell c1, and parses the received system message SI2ter to determine whether the system message SI2ter carries neighboring cell information of a TD-SCDMA network of the cell c1.

If the system message SI2ter carries the neighboring cell list of the TD-SCDMA network of the cell c1, it indicates that a cell of the TD-SCDMA network is deployed near the area where the terminal is located, and at this time, the terminal may not camp on any cell of the TD-SCDMA network yet; if the system message SI2ter does not carry the neighboring cell list of the TD-SCDMA network of the cell c1, it may be considered that a cell of the TD-SCDMA network may not be deployed near the area where the terminal is located (or, it may also be possible that a cell of the TD-SCDMA network is deployed near the area where the terminal is located, but no corresponding neighboring cell configuration is performed on the cell c1).

S204: If the terminal determines through parsing that the system message SI2ter carries a neighboring cell list of the TD-SCDMA network of the cell c1, the terminal searches for a cell of the TD-SCDMA network according to the neighboring cell list of the TD-SCDMA network.

In an application scenario, if the terminal determines that the received system message SI2ter carries the neighboring cell list of the TD-SCDMA network of the cell c1, and the terminal currently does not camp on any cell of the TD-SCDMA network, a dual-standby terminal may search for a cell of the TD-SCDMA network according to the neighboring cell information of the TD-SCDMA network, or search for a cell of the TD-SCDMA network in all frequency bands.

In addition, if the system message SI2ter does not carry the neighboring cell list of the TD-SCDMA network of the cell c1, the terminal may temporarily not search for a cell of the TD-SCDMA network (for example, the terminal considers by default that no cell of the TD-SCDMA network is deployed near the area where the terminal is located); or the terminal may also search for a cell of the TD-SCDMA network in all frequency bands (for example, the terminal considers by default that a cell of the TD-SCDMA network is deployed near the area where the terminal is located, but no corresponding neighboring cell configuration is performed on the cell c1).

It should be noted that, the foregoing procedure is mainly illustrated by taking the process that after the dual-standby terminal receives a system message SI2ter of a certain cell of the GSM network, the dual-standby terminal determines, according to whether the system message SI2ter carries neighboring cell information of the TD-SCDMA network, whether to start a cell search of the TD-SCDMA network as an example. In another embodiment, after the terminal receives a system message SIB11 from a certain cell of the TD-SCDMA network, the terminal may also determine, according to whether the system message SIB11 carries neighboring cell information of the GSM network, whether to start a cell search of the GSM network. This scenario is similar to that of the foregoing procedure, and is not repeatedly described here.

Figure 2B:
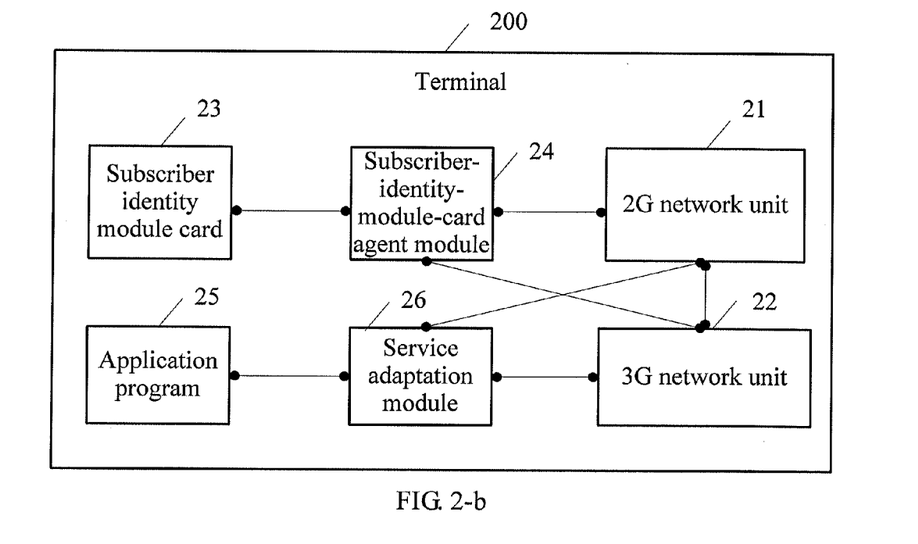

For example, referring to FIG. 2-b, FIG. 2-b is a schematic diagram of a terminal according to an embodiment of the present disclosure. For example, the terminal 200 is a single-card dual-standby terminal, that is, bases on one subscriber identity module card and includes a 2G network unit 21 (for example, a first network unit) and a 3G network unit 22 (for example, a second network unit), where the 2G network unit and the 3G network unit may be configured with independent antennas.

Figure 2C:
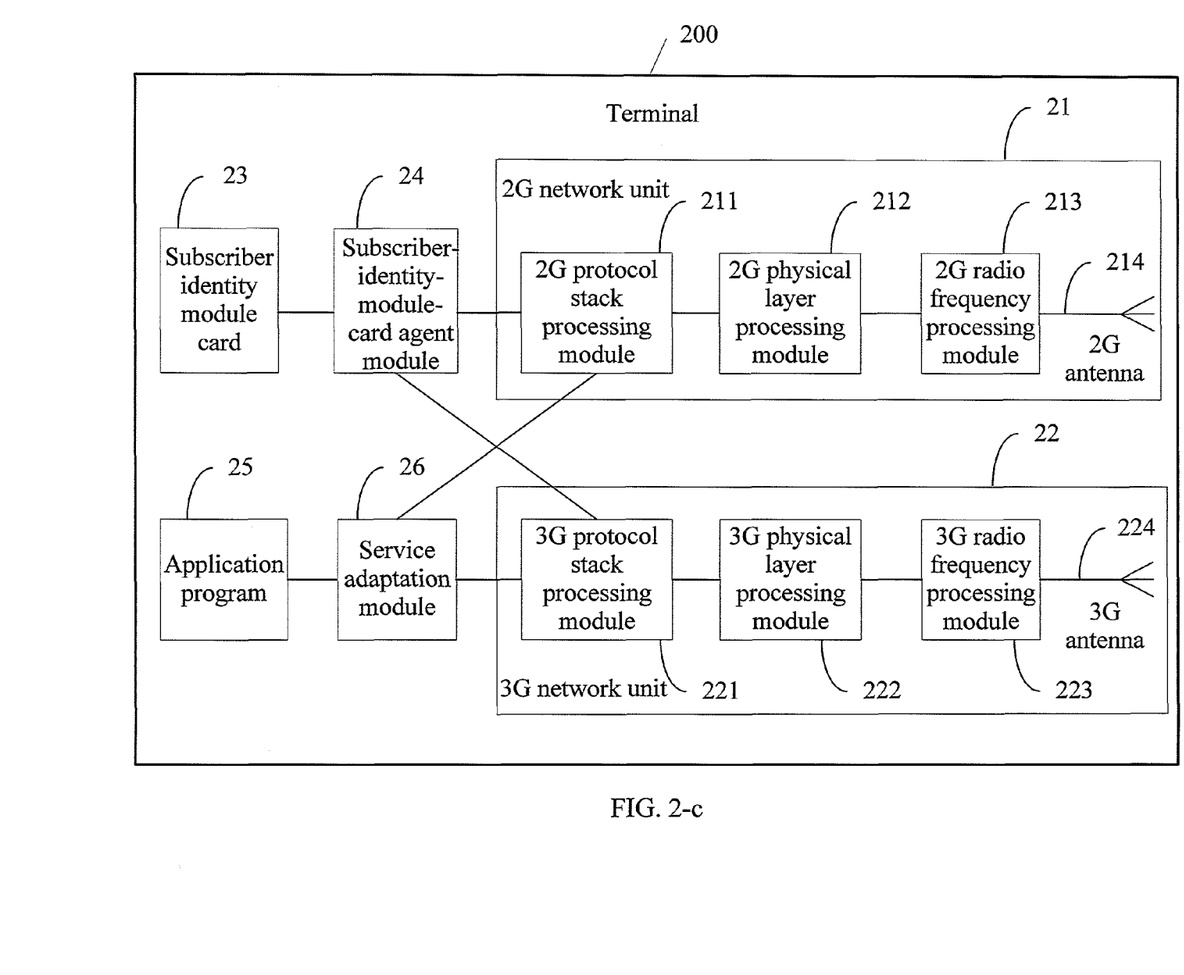

The 2G network unit 21 and the 3G network unit 22 are two independent processing modules, which are respectively configured to process a 2G service and a 3G service. Specifically, referring to FIG. 2-c, FIG. 2-c is a schematic diagram of a specific exemplary structure of the 2G network unit 21 and the 3G network unit 22.

The 2G network unit 21 includes: a 2G protocol stack processing module 211, a 2G physical layer processing module 212, a 2G radio frequency processing module 213, and a 2G antenna 214; and the 3G network unit 22 includes: a 3G protocol stack processing module 221, a 3G physical layer processing module 222, a 3G radio frequency processing module 223, and a 3G antenna 224.

In actual applications, the 2G protocol stack processing module 211 is configured to implement related protocol processing on the 2G network, where these protocols are generally protocols above a physical layer; the 2G physical layer processing module 212 is configured to implement data processing of the physical layer; the 2G radio frequency processing module 213 is configured to implement processing on a 2G radio frequency signal; and the 2G antenna 214 is configured to implement signal transmission and reception of the 2G network.

Similar to the sub-modules in the 2G network unit, in the 3G network unit, the 3G protocol stack processing module 311 is configured to implement related protocol processing on the 3G network; the 3G physical layer processing module 312 is configured to implement data processing of a physical layer; the 3G radio frequency processing module 313 is configured to implement processing on a 3G radio frequency signal; and the 3G antenna 314 is configured to implement signal transmission and reception of the 3G network.

In addition, similar to the terminal in the prior art, the terminal 200 in the embodiment of the present disclosure also includes a subscriber identity module card 23, a subscriber-identity-module-card agent module 24, an application program 25, and a service adaptation module 26.

The subscriber identity module card 23 is configured to store some information of a subscriber, where some information of a subscriber includes information of the subscriber in the 2G network and the 3G network. The subscriber identity module card 23 may be a SIM card frequently used in the 2G network or a more advanced USIM card.

The subscriber-identity-module-card agent module 24 is configured to act as an agent when the 2G/3G network unit accesses the subscriber identity module card 23, so as to enable the 2G/3G network unit to access corresponding 2G or 3G subscriber information in the subscriber identity module card 23 in the 2G and 3G network conditions.

The application program 25 refers to some programs related to services or control in the terminal.

The service adaptation module 26 is configured to connect the application program and the 2G/3G network unit, and is mainly configured to select, according to a camp status of a 2G/3G protocol stack, an appropriate protocol stack for service transmission.

In addition, in the embodiment of the present disclosure, the service adaptation module 26 is also configured to perform coordination processing on the 2G protocol stack processing module and the 3G protocol stack processing module, for example, the service adaptation module 26 may coordinate statuses of the two and notify the status of one to the other.

It should be noted that, some functions of the foregoing modules may also be implemented through other modules separately or by being integrated in other modules. For example, for the coordination function of the service module, a module may be set separately, or the function may be integrated in the 2G protocol stack processing module or the 3G protocol stack processing module. For example, during specific implementation by using hardware, it is assumed that modules of 2G functions (including protocol stack and physical layer processing modules) are implemented by one chip, and modules of 3G functions (including protocol stack and physical layer processing modules) are implemented by another chip, then, codes for coordinating statuses of the two may be written on the chip for implementing the 2G functional modules or on the chip for implementing the 3G functional modules.

For convenience of illustration, in the embodiment of the present disclosure, all corresponding steps are described by using the 2G network unit or the 3G network unit uniformly, instead of using each sub-module in the 2G network unit or the 3G network unit for describing the corresponding steps in detail. For example, when the terminal receives a parameter which is delivered by the 3G network and related to a 3G service and performs corresponding processing, the description in the embodiment of the present disclosure is: "The 3G network unit receives a parameter delivered by the 3G network and performs corresponding processing", and persons skilled in the art may know, with reference to the embodiment of the present disclosure and the prior art, that the detailed procedure of the step is: "First, a parameter (a radio frequency signal) delivered by the 3G network is received through the 3G antenna, afterwards, the received radio frequency signal is forwarded to the 3G radio frequency processing module and processing is performed on the radio frequency signal, then, the processed signal is sent to the 3G physical layer processing module and physical layer processing is performed on the processed signal by the 3G physical layer processing module, and after the processing is complete, the 3G physical layer module sends the signal to the 3G protocol stack processing module and corresponding processing is performed on the parameter".

The operating process of the terminal 200 based on FIG. 2-*c* may be as follows:

The 2G network unit 21 of the terminal 200 camps a CS domain on a 2G network preferentially, and executes a CS domain service; and the 3G network unit 22 of the terminal 200 camps a PS domain on a 3G network preferentially, and executes a PS domain service.

After the 2G network unit 21 of the terminal 200 receives a system message SI2ter from a cell c1, the 2G network unit 21 may parse the received system message SI2ter to determine whether the system message carries neighboring cell information of a TD-SCDMA network of the cell c1; if the system message SI2ter carries a neighboring cell list of the TD-SCDMA network of the cell c1, the 2G network unit 21 may send a TD-SCDMA network cell search indication to the 3G network unit 22, where the indication may include the neighboring cell list of the TD-SCDMA network; if the 3G network unit 22 receives the TD-SCDMA network cell search indication from the 2G network unit 21 (the terminal 200 may not camp on any cell of the TD-SCDMA network at this time), the 3G network unit 22 may start a cell search function and search, according to the neighboring cell list of the TD-SCDMA network, for a cell of the TD-SCDMA network (in addition, if the TD-SCDMA network cell search indication from the 2G network unit 21 does not include the neighboring cell list of the TD-SCDMA network, the 3G network unit 22 may start the cell search function and search for a cell of the TD-SCDMA network in all frequency bands); otherwise, if the 3G network unit 22 does not receive the TD-SCDMA network cell search indication from the 2G network unit 21, the 3G network unit 22 may not start the cell search function (for example, the 3G network unit 22 considers by default that no cell of the TD-SCDMA network is deployed near the area where the 3G network unit 22 is located), or, the 3G network unit 22 may also search for a cell of the TD-SCDMA network in all frequency bands (for example, the 3G network unit 22 considers by default that a cell of the TD-SCDMA network is deployed near the area where the 3G network unit 22 is located, but no corresponding neighboring cell configuration is performed on the cell c1).

For another example, after the 3G network unit 22 receives a system message SIB11 from a certain cell of the TD-SCDMA network, the 3G network unit 22 may parse the received system message SIB11 to determine whether the system message carries neighboring cell information of the GSM network of the cell; if the system message SIB11 carries a neighboring cell list of the GSM network of the cell, the 3G network unit 22 may send a GSM network cell search indication to the 2G network unit 21, where the indication may include the neighboring cell list of the GSM network; if the 2G network unit 21 receives the GSM network cell search indication from the 3G network unit 22 (the terminal 200 may not camp on any cell of the GSM network at this time), the 2G network unit 21 may start a cell search function and search, according to the neighboring cell list of the GSM network, for a cell of the GSM network (in addition, if the GSM network cell search indication from the 3G network unit 22 does not include the neighboring cell list of the GSM network, the 2G network unit 21 may start the cell search function and search for a cell of the GSM network in all frequency bands); otherwise, if the 2G network unit 21 does not receive the GSM network cell search indication from the 3G network unit 22, the 2G network unit 21 may not start the cell search function (for example, the 2G network unit 21 considers by default that no cell of the GSM network is deployed near the area where the 2G network unit 21 is located), or, the 2G network unit 21 may also search for a cell of the GSM network in all frequency bands (the 2G network unit 21 considers by default that a cell of the GSM network is deployed near the area where the 2G network unit 21 is located, but no corresponding neighboring cell configuration is performed on the cell where the 2G network unit 21 is located).

It should be understood that, a terminal that may operate in another 3G network (for example, wideband code division multiple access (WCDMA, Wideband Code Division Multiple Access), or code division multiple access 2000 (CDMA2000, Code Division Multiple Access 2000)) and 2G network (for example, GSM network, or code division multiple access (CDMA, Code Division Multiple Access) network) at the same time may also perform a cell search in a similar manner to that exemplified above, which is not repeatedly described here.

It can be seen from the foregoing that, after the terminal in this embodiment powers on and starts up, the 2G network unit of the terminal camps a CS domain on the GSM network with better signal coverage preferentially, and executes a CS domain service; the 3G network unit of the terminal camps a PS domain on the TD-SCDMA network with a higher data transmission rate preferentially, and executes a PS domain service. Because the CS domain service (for example, voice service) is sensitive to service unavailability, and the GSM network has better signal coverage, camping the CS domain on the GSM network may make the CS domain service more stable and improve subscriber experience, while camping the PS domain on the TD-SCDMA preferentially may make the experience of high-speed data transmission enjoyed. Moreover, after the terminal in the embodiment of the present disclosure receives a system message of a cell of a certain network where the terminal is located, the terminal first determines whether the system message carries neighboring cell information of another network of the cell, and if the system message carries neighboring cell information of another network of the cell, then searches for a cell of said another network. In this way, the terminal may perform a cell search of another network with a more specific purpose, so as to avoid an ineffective cell search as much as possible and reduce cell search time of the terminal, thus relatively reducing a processing load of the terminal and extending standby time of the terminal.

To facilitate better understanding of the solution in the embodiment of the present disclosure, a cell search scenario of a terminal that may operate in a GSM network and a TD-SCDMA network at the same time during service reselection is taken as an example in the following for introducing the solution in the embodiment of the present disclosure in more detail.

For example, the terminal is currently located in a cell c1 of the GSM network. The terminal includes a first network unit and a second network unit, the first network unit camps a circuit switching CS domain on the GSM network preferentially, and executes a CS domain service; and the second network unit of the terminal camps a packet switching PS domain on the TD-SCDMA network preferentially, and executes a PS domain service.

Figure 3:
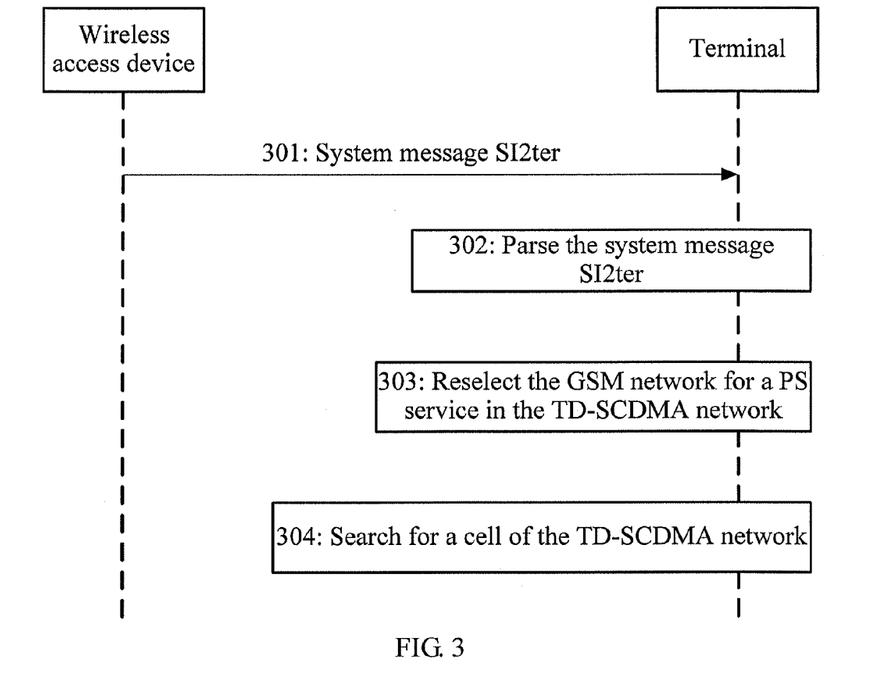
FIG. 3 is a schematic flow chart of another cell search method of a terminal according to an embodiment of the present disclosure.

Referring to FIG. 3, another embodiment of a cell search method of a terminal in the present disclosure may include:

S301: A serving wireless access device of a cell c1 delivers a system message SI2ter in the cell c1.

In an application scenario, the serving wireless access device of the cell c1 may deliver the system message SI2ter in the cell c1 periodically or upon triggering of a specific event (the specific event, for example, may be a change of configuration information of the cell c1), where the system message SI2ter may carry some related information of the cell c1, for example, may carry a cell identity of the cell c1, and a neighboring cell list of a GSM network to which the cell c1 belongs (the neighboring cell list records neighboring cell information of the GSM network). In addition, if a neighboring cell list corresponding to another network (for example, a TD-SCDMA network) is further configured by the cell c1 (the neighboring cell list records neighboring cell information of the TD-SCDMA network), the system message SI2ter may further carry the neighboring cell information of the TD-SCDMA network, where the neighboring cell information of the TD-SCDMA network is configured by the cell c1.

S302: The terminal receives the system message SI2ter from the cell c1, and determines whether the received system message SI2ter carries neighboring cell information of the TD-SCDMA network of the cell c1.

The terminal may parse the received system message SI2ter to determine whether the system message SI2ter carries a neighboring cell list of the TD-SCDMA network of the cell c1, if the terminal determines that the received system message SI2ter carries the neighboring cell list of the TD-SCDMA network of the cell c1, it indicates that a cell of the TD-SCDMA network is deployed near the area where the terminal is located; if the terminal determines that the received system message SI2ter does not carry the neighboring cell list of the TD-SCDMA network of the cell c1, it may be considered that a cell of the TD-SCDMA network may not be deployed near the area where the terminal is located (or, it is possible that a cell of the TD-SCDMA network is deployed near the area where the terminal is located, but no corresponding neighboring cell configuration is performed on the cell c1).

S303: The terminal reselects the GSM network for a PS service in the TD-SCDMA network.

In actual applications, for example, when the TD-SCDMA network is already not suitable to camp the PS service (possibly due to poor signal quality), the terminal may reselect the GSM network for the PS service in the TD-SCDMA network to obtain better service quality. After the GSM network is reselected for the PS service of the TD-SCDMA network, it may be considered that the terminal already does not camp on any cell of the TD-SCDMA network.

S304: If the terminal determines that the system message SI2ter carries a neighboring cell list of the TD-SCDMA network of the cell c1, the terminal searches for a cell of the TD-SCDMA network according to the neighboring cell list of the TD-SCDMA network.

In an application scenario, if the terminal determines that the received system message SI2ter carries the neighboring cell list of the TD-SCDMA network of the cell c1, and the GSM network is reselected for a service of the terminal, where the service of the terminal camps on the TD-SCDMA network, the terminal may search for a cell of the TD-SCDMA network according to the determined neighboring cell information of the TD-SCDMA network, or search for a cell of the TD-SCDMA network in all frequency bands.

In addition, if the terminal determines that the system message SI2ter does not carry the neighboring cell list of the TD-SCDMA network of the cell c1, the terminal may temporarily not search for a cell of the TD-SCDMA network (for example, the terminal considers by default that no cell of the TD-SCDMA network is deployed near the area where the terminal is located); or, the terminal may also search for a cell of the TD-SCDMA network in all frequency bands (for example, the terminal considers by default that a cell of the TD-SCDMA network is deployed near the area where the terminal is located, but no corresponding neighboring cell configuration is performed on the cell c1).

It should be noted that, the foregoing procedure is mainly illustrated by taking the process that after the terminal receives a system message SI2ter of a certain cell of the GSM network, if the GSM network is reselected for the PS service camping on the TD-SCDMA network, the terminal determines, according to whether the system message SI2ter carries neighboring cell information of the TD-SCDMA network, whether to start a cell search of the TD-SCDMA network as an example. Certainly, after the terminal receives a system message SIB11 from a certain cell of the TD-SCDMA network, if the TD-SCDMA network is reselected for a CS service camping on the GSM network, the terminal may also determine, according to whether the system message SIB11 carries neighboring cell information of the GSM network, whether to start a cell search of the GSM network. This scenario is similar to that of the foregoing procedure, and is not repeatedly described here.

Similarly, taking the single-card dual-standby terminal 200 with the structure shown in FIG. 2-b as an example, after the 2G network unit 21 of the terminal 200 receives a system message SI2ter from a cell c1, the 2G network unit 21 may determine whether the received system message SI2ter carries neighboring cell information of the TD-SCDMA network of the cell c1; if the 2G network unit 21 determines that the system message SI2ter carries a neighboring cell list of the TD-SCDMA network of the cell c1, the 2G network unit 21 may send a TD-SCDMA network cell search indication to the 3G network unit 22, where the indication may include the neighboring cell list of the TD-SCDMA network; the 3G network unit 22 reselects the GSM network for a PS service camping on the TD-SCDMA network, and if the 3G network unit 22 receives the TD-SCDMA network cell search indication from the 2G network unit 21, the 3G network unit 22 may start a cell search function and search, according to the neighboring cell list of the TD-SCDMA network, for a cell of the TD-SCDMA network (in addition, if the TD-SCDMA network cell search indication from the 2G network unit 21 does not include the neighboring cell list of the TD-SCDMA network, the 3G network unit 22 may start the cell search function and search for a cell of the TD-SCDMA network in all frequency bands); otherwise, if the 3G network unit 22 does not receive the TD-SCDMA network cell search indication from the 2G network unit 21, the 3G network unit 22 may not start the cell search function (for example, the 3G network unit 22 considers by default that no cell of the TD-SCDMA network is deployed near the area where the 3G network unit 22 is located), or, the 3G network unit 22 may also search for a cell of the TD-SCDMA network in all frequency bands (for example, the 3G network unit 22 considers by default that a cell of the TD-SCDMA network is deployed near the area where the 3G network unit 22 is located, but no corresponding neighboring cell configuration is performed on the cell c1).

For another example, after the 3G network unit 22 of the terminal 200 receives a system message SIB11 from a certain cell of the TD-SCDMA network, the 3G network unit 22 may determine whether the received system message SIB11 carries neighboring cell information of the GSM network of the cell; if the 3G network unit 22 determines that the system message SIB11 carries a neighboring cell list of the GSM network of the cell, the 3G network unit 22 may send a GSM network cell search indication to the 2G network unit 21, where the indication may include the neighboring cell list of the GSM network; the 2G network unit 21 reselects the TD-SCDMA network for a CS service camping on the GSM network, and if the 2G network unit 21 receives the GSM network cell search indication from the 3G network unit 21, the 2G network unit 21 may start a cell search function and search, according to the neighboring cell list of the GSM network, for a cell of the GSM network (in addition, if the GSM network cell search indication from the 3G network unit 22 does not include the neighboring cell list of the GSM network, the 2G network unit 22 may start the cell search function and search for a cell of the GSM network in all frequency bands); otherwise, if the 2G network unit 21 does not receive the GSM network cell search indication from the 3G network unit 22, the 2G network unit 21 may not start the cell search function (for example, the 2G network unit 21 considers by default that no cell of the GSM network is deployed near the area where the 2G network unit 21 is located), or, the 2G network unit 21 may also search for a cell of the GSM network in all frequency bands (for example, the 2G network unit 21 considers by default that a cell of the GSM network is deployed near the area where the 2G network unit 21 is located, but no corresponding neighboring cell configuration is performed on the cell where the 2G network unit 21 is located).

It should be understood that, a dual-standby terminal that may operate in another 3G network (for example, WCDMA, or CDMA2000) and 2G network (for example, GSM network, or CDMA network) at the same time may also perform a cell search in a similar manner to that exemplified above, which is not repeatedly described here.

It can be seen from the foregoing that, in the embodiment of the present disclosure, a CS domain is camped on the GSM network with better signal coverage preferentially, and a CS domain service is performed; and a PS domain is camped on the TD-SCDMA network with a higher data transmission rate preferentially, and a PS domain service is performed. Because the CS domain service (voice service) is sensitive to service unavailability, and the GSM network has better signal coverage, camping the CS domain on the GSM network may make the CS domain service more stable and improve subscriber experience, while camping the PS domain on the TD-SCDMA preferentially may make the experience of high-speed data transmission enjoyed. Moreover, if the dual-standby terminal in this embodiment reselects a certain network for a service camping on another network, after receiving a system message of a cell of the certain network where the dual-standby terminal is located, the dual-standby terminal first determines whether the system message carries neighboring cell information of said another network of the cell, and if the system message carries neighboring cell information of said another network of the cell, then searches for a cell of said another network. In this way, the dual-standby terminal may perform a cell search of another network with a more specific purpose, so as to avoid an ineffective cell search as much as possible and reduce cell search time of the dual-standby terminal, thus relatively reducing a processing load of the dual-standby terminal and extending standby time of the dual-standby terminal.

To facilitate better implementation of the solutions of the foregoing embodiments, an embodiment of the present disclosure further provides a device used to implement the foregoing solutions.

Figure 4:
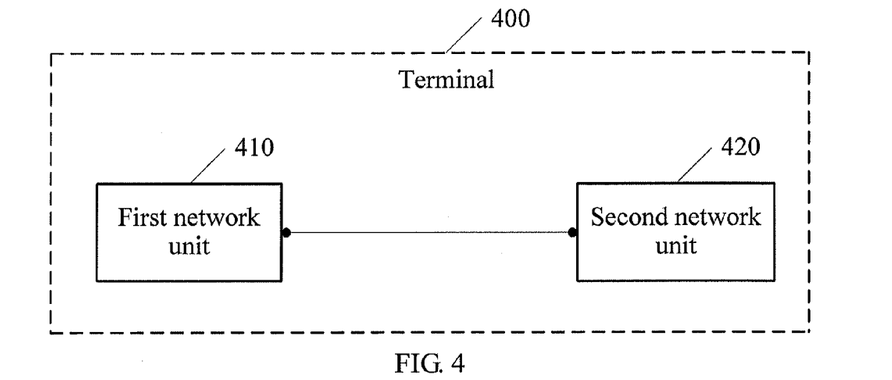
FIG. 4 is a schematic diagram of another terminal according to an embodiment of the present disclosure.

Referring to FIG. 4, a terminal 400 in an embodiment of the present disclosure may include a first network unit 410 and a second network unit 420.

The first network unit 410 is configured to camp a circuit switching CS domain on a first network preferentially, and execute a CS domain service.

The second network unit 420 is configured to camp a packet switching PS domain on a second network preferentially, and execute a PS domain service, where signal coverage of the first network is better than that of the second network, and a data transmission rate of the second network is higher than that of the first network.

The first network unit 410 is further configured to receive a system message from a cell of the first network where the first network unit 410 is located, and determine whether the received system message carries neighboring cell information of the second network of the cell.

The second network unit 420 is further configured to search for a cell of the second network after the first network unit 410 determines that the received system message carries the neighboring cell information of the second network of the cell.

In an application scenario, the first network unit 410 is further configured to send (send directly or forward through another module) a second network cell search indication that includes the neighboring cell information of the second network to the second network unit 420 after determining that the system message carries the neighboring cell information of the second network of the cell; and the second network unit 420 is further configured to search for a cell of the second network according to the neighboring cell information of the second network after receiving the second network cell search indication that includes the neighboring cell information of the second network and is sent from the first network unit 410.

In an application scenario, the second network unit 420 is further configured to search for a cell of the second network in all frequency bands or not to search for a cell of the second network after the first network unit 410 determines that the system message does not carry the neighboring cell information of the second network of the cell.

In an application scenario, the second network unit 420 is further configured to receive a system message from a cell of the second network where the second network unit 420 is located, and determine whether the received system message carries neighboring cell information of the first network of the cell of the second network; and the second network unit 420 is further configured to search for a cell of the first network after the first network unit 410 determines that the received system message carries the neighboring cell information of the first network of the cell of the second network.

In an application scenario, the second network unit 420 is further configured to send (send directly or forward through another module) a first network cell search indication that includes the neighboring cell information of the first network to the first network unit 410 after determining that the system message carries the neighboring cell information of the first network of the cell of the second network; and the first network unit 410 is further configured to search for a cell of the first network according to the neighboring cell information of the first network after receiving the first network cell search indication that includes the neighboring cell information of the first network and is sent from the second network unit 420.

In an application scenario, the first network unit 410 is further configured to search for a cell of the first network in all frequency bands or not to search for a cell of the first network after the second network unit 420 determines that the system message does not carry the neighboring cell information of the first network of the cell of the second network.

The first network and the second network may be two networks of different generations, for example, the first network may be a 2G network, and the second network is a 3G network; or, the first network is a 2G network, and the second network is a 4G network; or, the first network is a 3G network, and the second network may be a 4G network. Certainly, the first network and the second network may also be two different networks of the same generation, for example, the 3G network may be a WCDMA or TD-SCDMA.

It should be understood that, the operating mode of the terminal 400 in this embodiment may be the same as that of the terminal in the foregoing method embodiments, and may be used in combination to implement all the solutions in the foregoing method embodiments, the function of each functional module of the terminal 400 may be specifically implemented according to the methods in the foregoing method embodiments, and reference may be made to the relevant description of the foregoing embodiments for the specific implementation process, which is not repeatedly described here.

It can be seen from the foregoing that, the terminal 400 provided in this embodiment includes a first network unit and a second network unit, the terminal 400 supports camp on two networks at the same time, the first network unit camps a circuit switching CS domain on a first network with better signal coverage preferentially, and executes a CS domain service; the second network unit camps a packet switching PS domain on the second network with a higher data transmission rate preferentially, and executes a PS domain service. Because the CS domain service (voice service) is sensitive to service unavailability, and the GSM network has better signal coverage, camping the CS domain on the GSM network may make the CS domain service more stable and improve subscriber experience, while camping the PS domain on the TD-SCDMA preferentially may make the experience of high-speed data transmission enjoyed. Moreover, after the terminal 400 receives a system message of a cell of a certain network where the terminal 400 is located, the terminal 400 first determines whether the system message carries neighboring cell information of another network of the cell, and if the system message carries neighboring cell information of another network of the cell, then searches for a cell of said another network. In this way, the terminal 400 may perform a cell search of another network with a more specific purpose, so as to avoid an ineffective cell search as much as possible, reduce cell search time of the terminal 400, and improve search efficiency, thus relatively reducing a processing load of the terminal 400 and extending standby time of the terminal 400.

Figure 5:
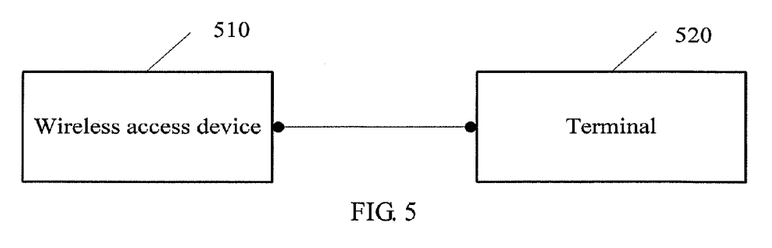
FIG. 5 is a schematic diagram of a communication system according to an embodiment of the present disclosure.

Referring to FIG. 5, a communication system in an embodiment of the present disclosure may include:

a wireless access device 510 and a terminal 520.

The wireless access device 510 is configured to deliver a system message in a cell of a first network served by the wireless access device 510.

The terminal 520 may include a first network unit and a second network unit.

The first network unit is configured to camp a circuit switching CS domain on the first network preferentially, and execute a CS domain service.

The second network unit is configured to camp a packet switching PS domain on a second network preferentially, and execute a PS domain service.

The first network unit is further configured to receive a system message from a cell of the first network where the first network unit is located, and determine whether the received system message carries neighboring cell information of the second network of the cell.

The second network unit is further configured to search for a cell of the second network after the first network unit determines that the received system message carries the neighboring cell information of the second network of the cell.

Signal coverage of the first network is better than that of the second network, and a data transmission rate of the second network is higher than that of the first network.

In an application scenario, the first network unit is further configured to send a second network cell search indication that includes the neighboring cell information of the second network to the second network unit after determining that the system message carries the neighboring cell information of the second network of the cell; and the second network unit is further configured to search for a cell of the second network according to the neighboring cell information of the second network after receiving the second network cell search indication that includes the neighboring cell information of the second network and is sent from the first network unit.

Furthermore, the communication system may further include:

a second wireless access device, configured to deliver a system message in a cell of the second network served by the second wireless access device.

The second network unit is further configured to receive the system message from the cell of the second network where the second network unit is located, and determine whether the received system message carries neighboring cell information of the first network of the cell of the second network.

The second network unit is further configured to search for a cell of the first network after the first network unit determines that the received system message carries the neighboring cell information of the first network of the cell of the second network.

In an application scenario, the second network unit is further configured to send a first network cell search indication that includes the neighboring cell information of the first network to the first network unit after determining that the system message carries the neighboring cell information of the first network of the cell of the second network; and the first network unit is further configured to search for a cell of the first network according to the neighboring cell information of the first network after receiving the first network cell search indication that includes the neighboring cell information of the first network and is sent from the second network unit.

The first network and the second network may be two networks of different generations, for example, the first network may be a 2G network, and the second network may be a 3G network or a 4G network; or, the first network is a 3G network, and the second network may be a 4G network. Certainly, the first network and the second network may also be two different networks of the same generation, for example, the first network and the second network are two different 2G, 3G, or 4G networks.

It should be understood that, the wireless access device 510 in this embodiment may be the wireless access device according to the foregoing method embodiments, the terminal 520 may be the terminal according to the foregoing method embodiments, and may be used in combination to implement all the solutions in the foregoing method embodiments, the function of each functional module of the terminal 520 may be specifically implemented according to the methods in the foregoing method embodiments, and reference may be made to the relevant description of the foregoing embodiments for the specific implementation process, which is not repeatedly described here.

It can be seen from the foregoing that, the terminal 520 provided in this embodiment includes a first network unit and a second network unit, the terminal supports camp on two networks at the same time, the first network unit camps a circuit switching CS domain on a first network with better signal coverage preferentially, and executes a CS domain service; the second network unit camps a packet switching PS domain on the second network with a higher data transmission rate preferentially, and executes a PS domain service. Because the CS domain service (voice service) is sensitive to service unavailability, and the GSM network has better signal coverage, camping the CS domain on the GSM network may make the CS domain service more stable and improve subscriber experience, while camping the PS domain on the TD-SCDMA preferentially may make the experience of high-speed data transmission enjoyed. Moreover, after the dual-standby terminal 520 receives a system message sent by a serving wireless access device 510 in a cell of a certain network where the dual-standby terminal 520 is located, the dual-standby terminal 520 first determines whether the system message carries neighboring cell information of another network of the cell, and if the system message carries neighboring cell information of another network of the cell, then searches for a cell of said another network. In this way, the terminal 520 may perform a cell search of another network with a more specific purpose, so as to avoid an ineffective cell search as much as possible, reduce cell search time of the terminal 520, and improve search efficiency, thus relatively reducing a processing load of the terminal 520 and extending standby time of the terminal 520.

It should be noted that, the foregoing method embodiments are expressed as a series of operations for ease of description. However, it should be known to persons skilled in the art that the present disclosure is not limited to the described sequence of the operations, because some steps may be performed in other sequences or concurrently according to the present disclosure. Furthermore, it should also be known to persons skilled in the art that all the embodiments described in the specification are exemplary embodiments, and the involved operations and modules may not be necessary for the present disclosure.

In the foregoing embodiments, descriptions of the embodiments have different emphasis on different aspects, and for a part that is not detailed in an embodiment, reference may be made to the relevant descriptions of other embodiments In summary, the terminal provided in the embodiments of the present disclosure includes a first network unit and a second network unit, the terminal supports camp on two networks at the same time, the first network unit camps a circuit switching CS domain on a first network with better signal coverage preferentially, and executes a CS domain service; the second network unit camps a packet switching PS domain on a second network with a higher data transmission rate preferentially, and executes a PS domain service. Because the CS domain service (voice service) is sensitive to service unavailability, and the GSM network has better signal coverage, camping the CS domain on the GSM network may make the CS domain service more stable and improve subscriber experience, while camping the PS domain on the TD-SCDMA preferentially may make the experience of high-speed data transmission enjoyed.

Moreover, after the terminal receives a system message of a cell of a certain network where the terminal is located, the terminal first determines whether the system message carries neighboring cell information of another network of the cell, and if the system message carries neighboring cell information of another network of the cell, then searches for a cell of said another network. In this way, the terminal may perform a cell search of another network with more a specific purpose, so as to avoid an ineffective cell search as much as possible, reduce cell search time of the terminal, and improve search efficiency, thus relatively reducing a processing load of the terminal and extending standby time of the terminal.

Persons of ordinary skill in the art understand that all or part of the steps of the methods according to the foregoing embodiments may be implemented by a program instructing relevant hardware having a processor. The program may be stored in a computer readable storage medium accessible to the processor. The storage medium may include a read-only memory, a random access memory, a magnetic disk, or an optical disk.

The cell search method of a terminal and related device and system provided in the embodiments of the present disclosure are described in detail above. The principles and implementations of the present disclosure are described here through specific examples. The description about the embodiments is merely provided for ease of understanding of the method and core ideas of the present disclosure. Persons of ordinary skill in the art can make variations and modifications to the present disclosure in terms of the specific implementations and application scopes according to the ideas of the present disclosure. Therefore, the specification shall not be construed as limitations to the present disclosure.

What is claimed is:

1. A cell search method of a terminal, wherein the terminal comprises a first unit and a second unit, the terminal supports camping on a first network by the first unit and a second network by the second unit simultaneously,
wherein a circuit switching (CS) domain is preferentially camped on the first network, and a packet switching (PS) domain is preferentially camped on the second network; and the method comprising:
determining by the first unit, whether a system message received from a cell in the first network carries information of a neighboring cell, wherein the neighboring cell is located in the second network which is neighboring to the cell in the first network; and
searching for by the second unit, the neighboring cell based on the information of the neighboring cell after the first unit determining that the system message carries the information of the neighboring cell, wherein signal coverage of the first network is better than that of the second network, and a data transmission rate of the second network is higher than that of the first network;
wherein the first unit camping in the CS domain and the PS domain on the first network based on first information of a subscriber in the first network stored in a single card of the terminal, and the second unit camping in the PS domain on the second network based on second information of the subscriber in the second network are both stored on a single card.

2. The method according to claim 1, wherein the first network is reselected for a service of the second unit prior to the searching for the neighboring cell in the second network.

3. The method according to claim 1, wherein after determining that the system message carries information of the neighboring cell, the method further comprising:
instructing, by the first unit, the second unit to search for the neighboring cell.

4. The method according to claim 3, wherein the instructing of the second unit to search for the neighboring cell by the first unit, comprising:
sending by the first unit, an indication for searching for the neighboring cell to the second unit, wherein the indication carries the information of the neighboring cell.

5. The method according to claim 2, further comprising:
camping by the second unit, the PS domain on the second network after the neighboring cell is searched, wherein the CS domain maintains camping on the first network while the PS domain is camped on the second network after the neighboring cell is being searched.

6. The method according to claim 1, wherein the CS domain is camped preferentially by the first unit on the first network through a CS attach procedure.

7. The method according to claim 1, wherein the first unit and the second unit are configured with independent antennas.

8. The method according to claim 1, further comprising:
obtaining, by the first unit, the first information from the single card via an agent connected to the single card; and
obtaining, by the second unit, the second information from the single card via the agent.

9. The method according to claim 1, wherein
the first network being a 2nd Generation (2G) network, and the second network being a 3rd Generation (3G) network; or
the first network being one of a 2G network and a 3G network, and the second network being a 4th Generation (4G) network.

10. A terminal, comprising a first processor coupled to memory storing instruction with first antenna, a second processor coupled to memory storing instruction with second antenna, and a single card; wherein the terminal supports camping on a first network by the first processor with the first antenna and a second network by the second processor with the second antenna simultaneously, a circuit switching (CS) domain is preferentially camped on the first network, and a packet switching (PS) domain is preferentially camped on the second network, wherein signal coverage of the first network is better than that of the second network, and a data transmission rate of the second network is higher than that of the first network;
the first processor is further configured to determine whether a system message received from a cell in the first network carries information of a neighboring cell, wherein the neighboring cell is located in the second network and is neighboring to the cell in the first network;
the second processor is further configured to search for the neighboring cell based on the information of the neighboring cell when the first processor determines whether the system message carries the information of the neighboring cell;
the single card stores first information of a subscriber in the first network and second information of the subscriber in the second network;
the first processor obtains the first information from the single card, and camps the CS domain and the PS domain on the first network based on the first information; and
the second processor obtains the second information from the single card, and camps the PS domain on the second network based on the second information.

11. The terminal according to claim 10, wherein:
the second processor is configured to search for the cell of the second network if the first network is reselected for a service of the second processor.

12. The terminal according to claim 10, wherein:
the first processor performs instructing the second processor to search for the neighboring cell after determining that the system message carries information of the neighboring cell.

13. The terminal according to claim 12, wherein:
the first processor performs sending an indication for searching for the neighboring cell to the second processor, wherein the indication carries the information of the neighboring cell.

14. The terminal according to claim 10, wherein:
the second processor preferentially performs camping the PS domain on the second network through a PS attach procedure.

15. The terminal according to claim 10, wherein:
the first processor preferentially further performs camping the CS domain on the first network through a CS attach procedure.

16. The terminal according to claim 10, wherein:
the first processor and
the second processor are configured with independent antennas.

17. The terminal according to claim 10, further comprising:
an agent connected to the single card, wherein
the first processor obtains the first information from the single card via the agent; and
the second processor obtains the second information from the single card via the agent.

18. The terminal according to claim 10, wherein
the first network being a 2nd Generation (2G) network, and the second network being a 3rd Generation (3G) network; or
the first network being one of a 2G network and a 3G network, and the second network being a 4th Generation (4G) network.

\* \* \* \* \*